Patented June 29, 1954

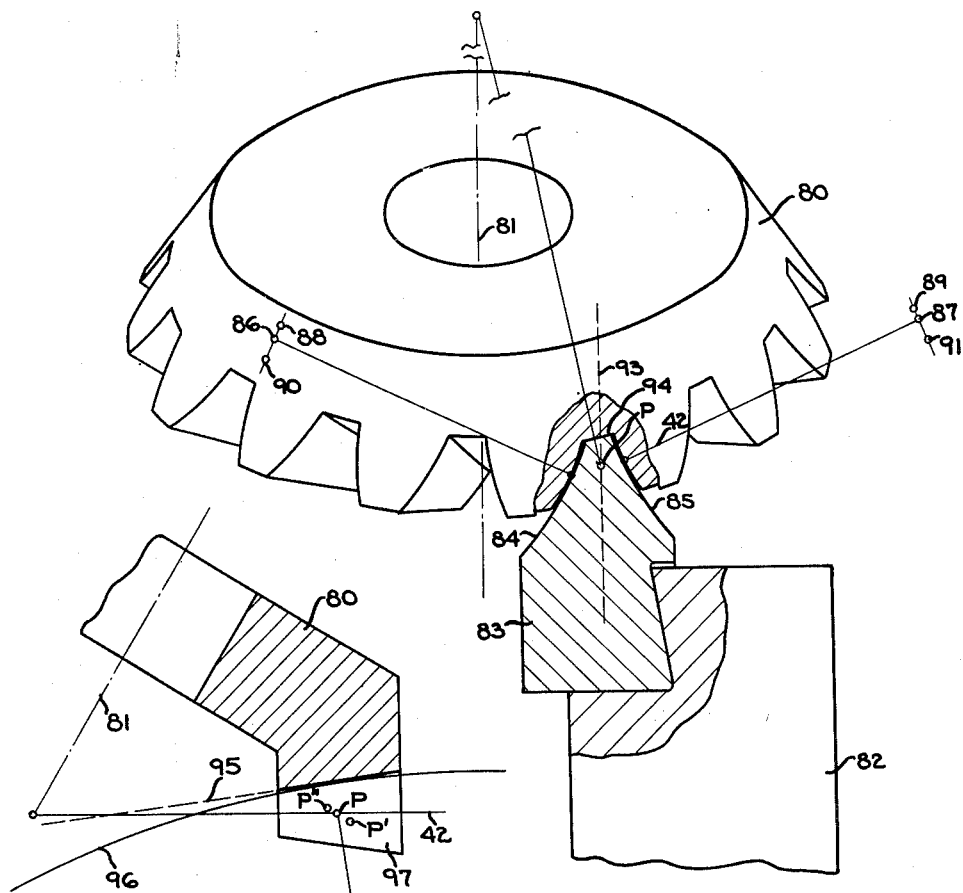

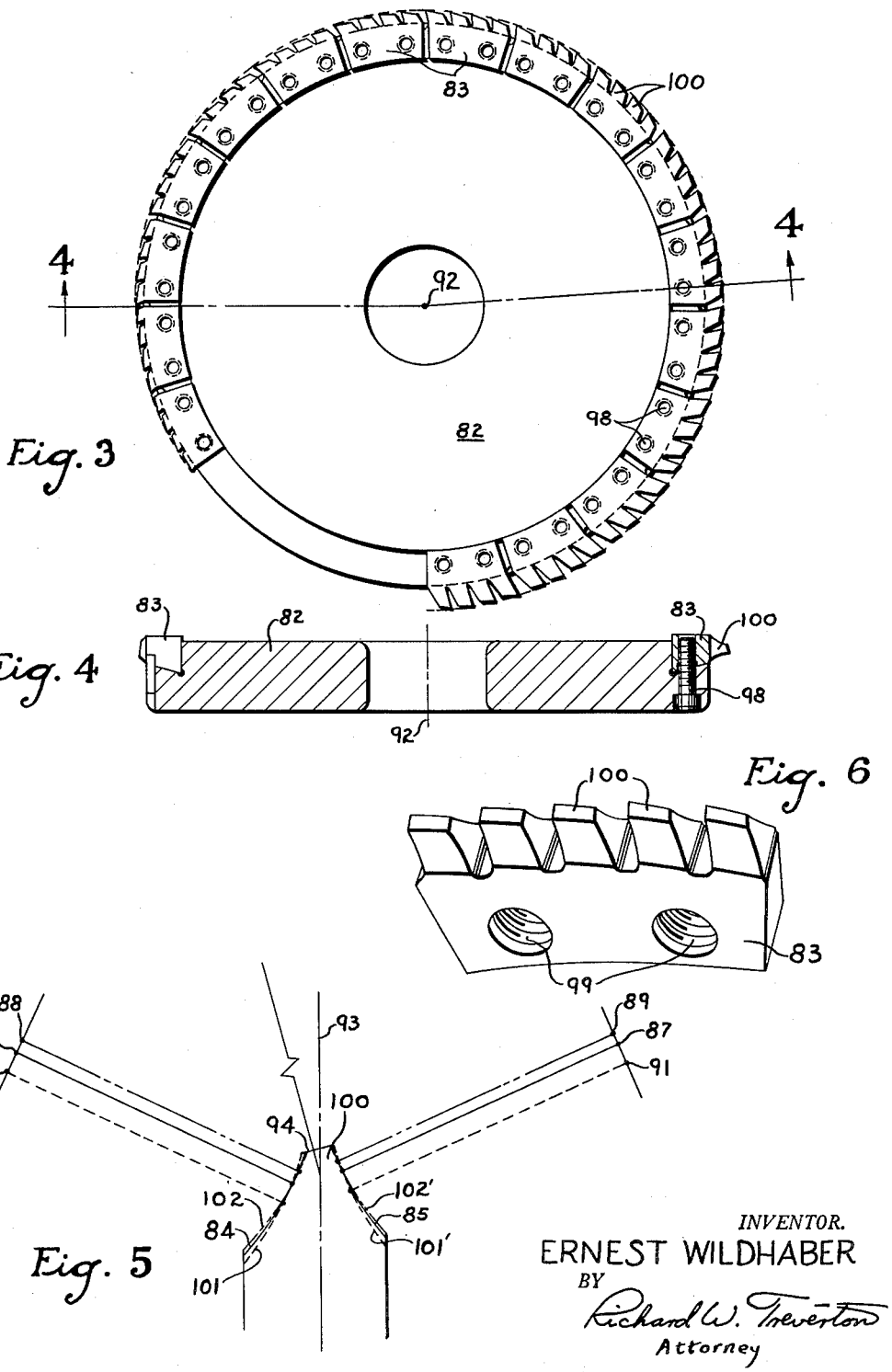

2,682,099

UNITED STATES PATENT OFFICE 2,682,099

GEAR CUTTER

Ernest Wildhaber, Brighton, N. Y., assignor to Gleason Works, Rochester, N. Y., a corporation of New York Original application September 12, 1945, Serial No. 615,786. Divided and this application March 21, 1950, Serial No. 151,020

7 Claims. (Cl. 29—105)

The present invention relates to gear cutters and in particular to cutters for cutting tapered gears which mesh with angularly disposed, offset axes, and in which one or both members of the meshing gear pair have straight, oblique, that is, non-radial teeth.

Longitudinally curved tooth hypoid gears have come into extensive use in recent years, being widely employed in the final drives of automotive vehicles and in many industrial installations. For years, textbooks have contained treatises on bevel gears with straight, oblique teeth designed to mesh with offset, angularly disposed axes. These gears are called skew bevel gears. Some such gears have been made, but such gears have been used only rarely because they do not have the structure to mesh correctly and in practice no satisfactory method has been developed for cutting them.

The present application is a division of my pending U. S. application Serial No. 615,786, filed September 12, 1945, now Patent No. 2,506,676, granted May 9, 1950. My parent application relates to a novel form of tapered gears which mesh correctly with angularly disposed axes and in which at least one member of a pair has straight, oblique teeth. I have choosen to call these gears skew hypoid gears. The present application covers a novel cutter employable in the production of such gears.

One object of the present invention is to provide a cutter which will produce correct skew hypoid gears of the structure disclosed and claimed in my parent application.

Another object of the present invention is to provide a cutter of suitable form for cutting skew hypoid gears at a production rate which will make their cost practical.

Other objects of the invention will be apparent hereinafter from the specification and from the recital of the appended claims.

Hypoid gears made according to the present invention have teeth on one or both members of the pair which are straight longitudinally; and the teeth of at least one member of the pair are oblique, that is, skew. The teeth of both members of the pair, unlike the teeth of longitudinally curved tooth hypoid gears, are of the same hand. In this, they resemble the skew bevel gears of the textbooks. They differ from skew bevels, however, having unequal pressure angles on opposite sides of the teeth. The pressure angle of the tooth sides which face the gear axis, that is, which are toward the gear axis, is smaller than the pressure angle on the opposite sides of the teeth. This difference in pressure angle on the two sides of the teeth permits of making tooth profiles of the same curvature on opposite sides of the teeth, and which have sufficient duration of contact on both sides for smooth continuous driving.

In my parent application above mentioned I have disclosed at considerable length the geometry and the theory underlying the production of the gears of this invention, and reference may be had to that application for more complete details thereof.

In the drawings:

Fig. 1 is a diagrammatic view illustrating certain principles underlying the cutting of a hypoid gear with a cutter made according to this invention, the gear being shown only fragmentarily and in section;

Fig. 2 is a view taken at right angles to that of Fig. 1 with parts being broken away, further illustrating not only these principles but also one embodiment of a cutter made according to this invention for cutting skew hypoid gears, the cutter being shown only fragmentarily and part of the gear being broken away to show more clearly the cutter structure and its operation;

Fig. 3 is a side elevation of a cutter made according to one embodiment of the present invention;

Fig. 4 is a section through this cutter on the line 4—4 of Fig. 3 looking in the direction of the arrows;

Fig. 5 is a diagrammatic view illustrating on a somewhat enlarged scale the construction of this cutter; and Fig. 6 is a perspective view of one of the cutting segments of the cutter.

In its preferred embodiment a cutter made according to the present invention is similar to the cutter disclosed in my prior Patent No. 2,357,153, granted August 29, 1944, in that it has cutting blades arranged part way only around its periphery with a gap between the last and first blades. The gap permits indexing of the work while the cutter is in operative relation with the work without withdrawing the cutter from the work, indexing of the work being effected while the gap in the cutter is abreast of the work. The cutter of the present invention is intended, also, to be used in the same manner as the cutter of my prior patent mentioned. In operation, this cutter is rotated on its axis and simultaneously fed across the face of the blank. If the cutter has both roughing and finishing blades, it is preferably fed in one direction while the roughing blades are operating upon the blank, and is fed in the opposite direction while the finishing blades are operating upon the blank; then the roughing operation begins anew on a new tooth space of the blank.

Referring now to the drawings by numerals of reference, 80 denotes one member of a right angle skew hypoid drive constructed according to my invention. The gear 80 shown is a mitre gear. It is one member of a pair of skew hypoid gears which mesh with axes at right angles and which have equal numbers of teeth, and which can, therefore, be called skew hypoid mitre gears. The teeth of this gear are straight and oblique, that is, non-radial of the axis of the gear. 42 denotes the instantaneous axis of mesh of this gear with its mate. The axis of rotation of this gear is denoted at 81.

The cutter for cutting this gear is denoted at 82, and is shown only fragmentarily. It has a plurality of cutting segments 83 arranged part way only around its periphery in a manner similar to the arrangement of the cutting segments of the cutter shown in my prior Patent No. 2,357,153, above mentioned. Each segment 83 has a plurality of cutting blades or teeth 100. Each of the cutting segments is secured to the cutter head by screws 98 that pass through the holes 99 (Fig. 6) in the segment. Each of the blades or teeth 100 of the cutter 82 may have side-cutting edges 84 and 85 (Fig. 2) at opposite sides or, alternately, successive blades of the cutter may be sharpened to cut, respectively, on opposite sides of a tooth space. The opposite side-cutting edges 84 and 85 of the blades 100 are of circular arcuate shape and the centers of curvature of the corresponding side edges of successive blades are displaced from one another progressively both radially and axially of the cutter, that is, these centers of curvature are arranged in a three-dimensional spiral about the axis of the cutter. Thus, as shown in Fig. 2, the center of the side-cutting edge 84 of the blade 100 shown may be at 86, and the centers of curvature of corresponding side-cutting edges of other blades which precede and follow blade 100 and which cut on the same side of a tooth space of the work may be at 88 and 90, respectively. Likewise the center of the side cutting edge 85 of blade 100 shown may be at 87, and the centers of curvature of corresponding side-cutting edges of other blades which precede and follow blade 100 and which cut on the same side of the tooth space as the side cutting edge 85, may be at 89 and 91, respectively. In Fig. 5 I have shown superimposed on the cutting edges 84 and 85, which may cut, for instance, at means points along the length of a tooth space of the gear 80, other cutting edges 101, 101', and 102, 102' which cut at the large end and at the small end, respectively, of the tooth space. It is to be noted that while the cutting surfaces, which contain the side-cutting edges of the blades, are alike on the two sides of the cutter, they have different positions radially of the cutter and are displaced angularly with reference to one another about the axis of the cutter. The result is that instead of any two opposite side-cutting edges 84 and 85, which cut at approximately opposite places along the length of a tooth space of the work, being symmetrical with reference to a line 93 bisecting that blade 100, that is, with reference to a plane perpendicular to the cutter axis 92, the sides 84 and 85 are unsymmetrical with reference to that line and plane. It is to be noted further that the tip-cutting edges 94 of the blades are inclined to the axis 92 of the cutter, not parallel to it. This enables the blades to cut the proper root surface in each tooth space of the blank, despite the oblique, skew cutting movement of the tool across the face of the blank as will be described hereinafter. Each of the cutting blades or teeth 100 is relieved on its tip and side surfaces back of its front cutting face in conventional manner to provide sharp tip and side-cutting edges.

The cutting operation is illustrated diagrammatically in Fig. 1. The cutter is, as previously stated, rotated on its axis 92 and simultaneously fed, preferably at a uniform rate, along the root line 95 of the work. The feed movement is in a direction oblique, that is, skew, to a line radial of the gear axis 81 in order to produce oblique skew teeth on the work. In Fig. 1 the arc 96 denotes the position of the tip surface of the cutter at a mean point along the length of the tooth when the axis of the cutter is at 92' and the side cutting surface of the cutter is in contact with the side tooth surface 97 of the gear at mean point P. With the cutter described and operating in the manner described, the two sides of the teeth of the work will be equally inclined with respect to the central plane 93 of the cutter, but they will be displaced depthwise and longitudinally with respect to one another. P' and P'' denote the points on the opposite sides of the two tooth surfaces, which for one turning position of rotation coincide with mean point P.

When the cutter has been fed in one direction across the tooth zone of the work its direction of feed is reversed, although the cutter continues to rotate in the same direction, and when the gap in the cutter is abreast of the work, the work is indexed to bring a new tooth space of the work into position to be cut. All this is like the cutting method described in my Patent No. 2,357,153 and need not further be described here.

While the invention has been described in connection with a particular embodiment thereof, it is to be understood that the invention is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A rotary disc cutter for tapered gears, the cutter having a plurality of radially disposed cutting blades, corresponding side-cutting edges of successive blades being of circular arcuate shape and having the same radii of curvature but having their centers of curvature displaced progressively radially and axially to the cutter and arranged on a three dimensional spiral about the axis of the cutter, the spirals, along which are disposed the centers of curvature of the side-cutting edges opposite sides of a central plane of rotation of the cutter, being displaced with reference to one another angularly about the axis of the cutter.

2. A rotary disc cutter for tapered gears, the cutter having a plurality of radially disposed cutting blades which have opposite side-cutting edges, the opposite side edges of each blade being unsymmetrical to a plane perpendicular to the axis of the cutter, the side-cutting edges of the blades on the opposite sides of said plane constituting the side-cutting surfaces of the cutter, and the profiles of said cutting surfaces at opposite sides of said plane being alike but said profiles in any axial plane through the cutter being unsymmetrical to each other with reference to the first-mentioned plane and the axis of the cutter.

3. A rotary disc cutter for tapered gears, the cutter having a plurality of radially disposed cutting blades which have opposite side-cutting edges of concave circular arcuate profile shape, successive side-cutting edges on each side of a central plane of rotation perpendicular to the axis of the cutter being of constant profile shape but having their centers of curvature displaced progressively radially and axially of the cutter, the side-cutting edges of the blades at opposite sides of said central plane but in the same axial plane of the cutter being unsymmetrically disposed with reference to said central plane and the axis of the cutter.

4. A rotary disc cutter for skew hypoid gears, the cutter having a plurality of radially disposed cutting blades, corresponding side-cutting edges of successive blades being of circular arcuate shape and having the same radii of curvature, the successive side-cutting edges on each side of a central plane of rotation of the cutter being disposed along a three-dimensional spiral, the two spirals being of varying lead both in an axial direction and in a radial direction, and said spirals being symmetrical with respect to said central plane but being displaced relative to each other angularly about the axis of the cutter.

5. A rotary disc cutter for skew hypoid gears, the cutter having a plurality of radially disposed cutting blades, corresponding side-cutting edges of successive blades being of circular arcuate shape and having the same radii of curvature, the successive side-cutting edges on each side of a central plane of rotation of the cutter being disposed along a three-dimensional spiral, the two spirals being of varying lead both in an axial direction and in a radial direction, the lead in the axial direction being proportional to the lead in the radial direction, and said spirals being symmetrical with respect to said central plane but being displaced relative to each other angularly about the axis of the cutter.

6. A rotary disc cutter for tapered gears, the cutter having a plurality of radially disposed cutting blades which have concave side-cutting edges at opposite sides that are of constant profile shape, successive side-cutting edges on the same side of the cutter being displaced progressively relative to one another radially and axially of the cutter, and opposite side-cutting edges of the blades being unsymmetrically disposed with reference to the axis of the cutter and a central plane of rotation perpendicular to said axis.

7. A rotary disc cutter for tapered gears, the cutter having a plurality of radially disposed blades which have tip-cutting and opposite side-cutting edges, the tip-cutting edges being inclined at an acute angle to the axis of the cutter, the side-cutting edges being concave and of constant profile shape, successive side-cutting edges on the same side of the cutter being displaced progressively relative to one another radially and axially of the cutter, and opposite side-cutting edges of the blades being unsymmetrically disposed with reference to the axis of the cutter and a central plane of rotation perpendicular to said axis.

References Cited in the file of this patent

UNITED STATES PATENTS

| Number | Name | Date |
|---|---|---|
| 2,267,181 | Wildhaber | Dec. 23, 1941 |
| 2,267,182 | Wildhaber | Dec. 23, 1941 |
| 2,357,153 | Wildhaber | Aug. 29, 1944 |
| 2,374,890 | Pelphrey | May 1, 1945 |